Figure 1:
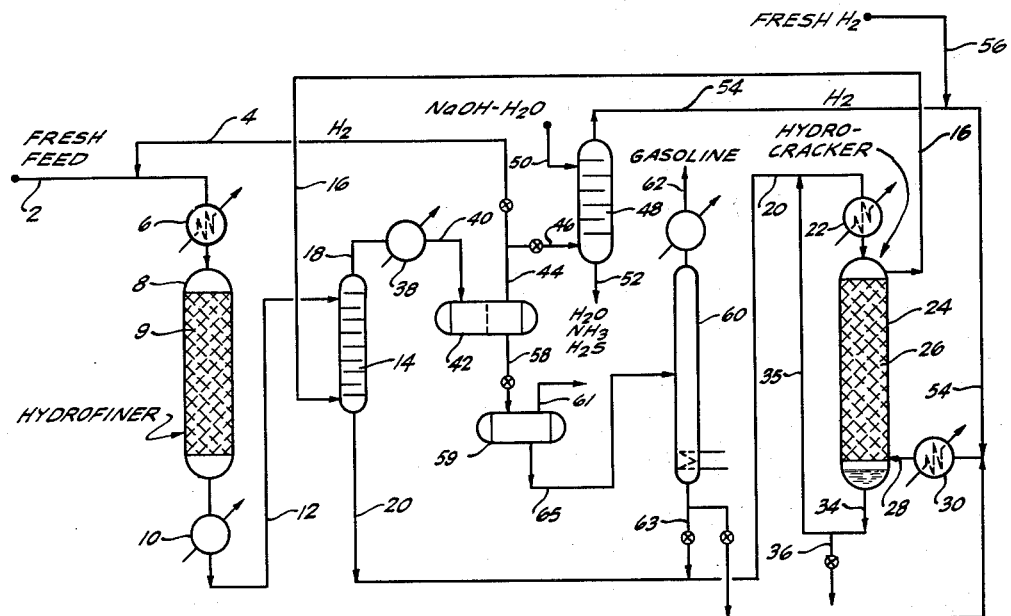

INVENTORS.
ROBERT H. HASS
CLOYD P. REEG
FRANK C. RIDDICK
BY
James S. Henderson
ATTORNEY

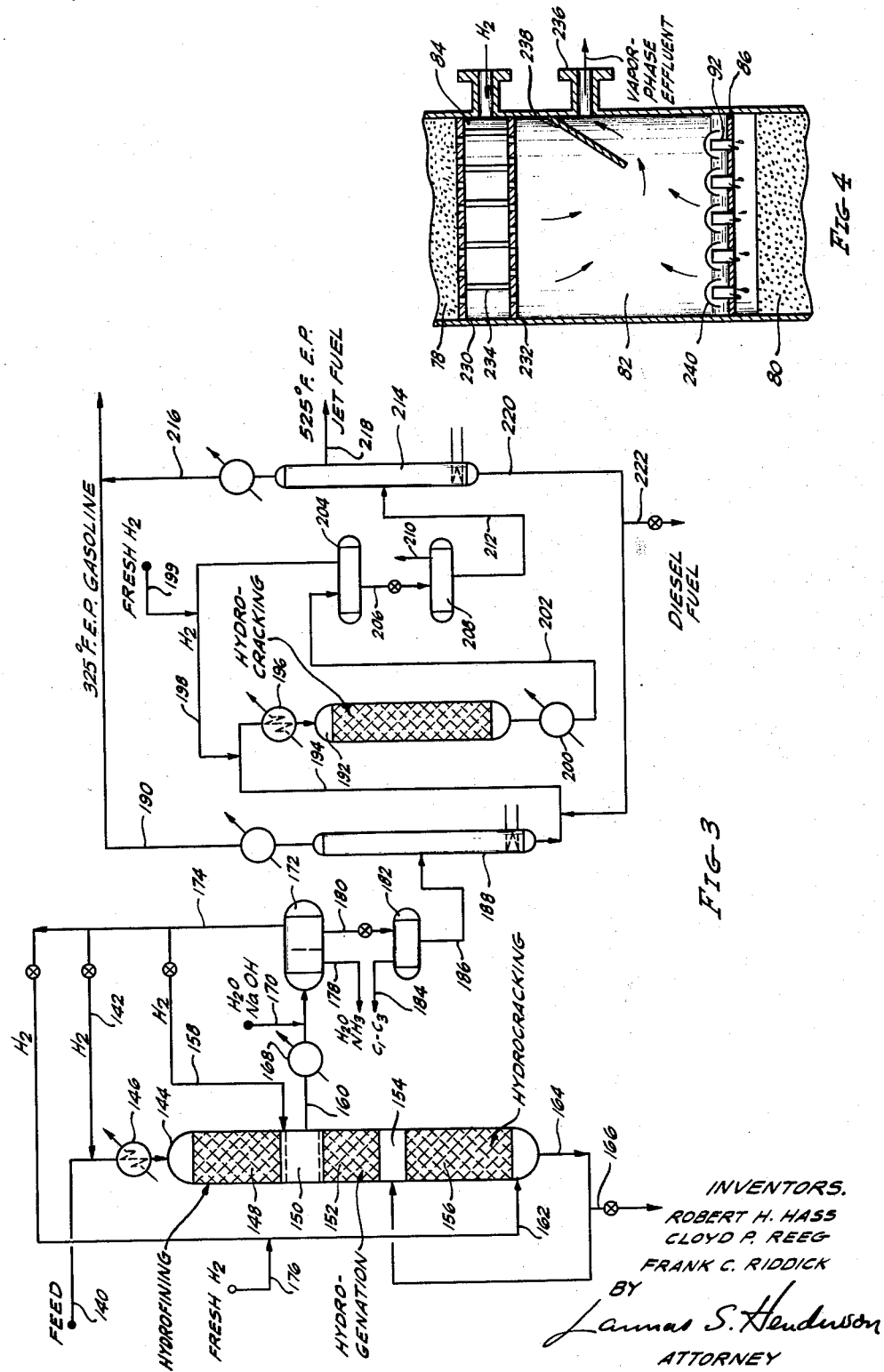

United States Patent Office 3,256,178
Patented June 14, 1966

3,256,178
HYDROCRACKING PROCESS
Robert H. Hass, Fullerton, and Cloyd P. Reeg and Frank C. Riddick, Orange, Calif., assignors to Union Oil Company of California, Los Angeles, Calif., a corporation of California
Filed May 25, 1965, Ser. No. 458,663
20 Claims. (Cl. 208—89)

This application is a continuation-in-part of application Serial No. 180,699, filed March 19, 1962 and now abandoned.

This invention relates to the catalytic hydrocracking of hydrocarbons to produce lower boiling hydrocarbons, boiling for example in the gasoline or jet fuel range. More specifically, the invention is concerned with the hydrocracking of nitrogen- and/or sulfur-containing mineral oils. In broad aspect, the invention embraces an integrated hydrofining-hydrocracking process wherein the initial feedstock is first subjected to catalytic hydrofining in concurrent flow with hydrogen, and is then subjected to low temperature hydrocracking, with the hydrofined liquid feed flowing countercurrently to a hydrogen stream. By operating in this manner, important economies are achieved by way of improving hydrocracking efficiency, and reducing the quantity of hydrofining catalyst required for a given feed throughput.

Considered in greater detail, the invention comprises the following steps: (1) the initial feedstock is subjected to an incomplete catalytic hydrofining in concurrent flow with added hydrogen under conditions such that the organic nitrogen content is reduced to between about 10 and 100 parts per million; (2) the liquid phase hydrofining effluent is stripped with vapor phase effluent from the subsequent countercurrent hydrocracking operation in order to strip out ammonia, hydrogen sulfide and light hydrocarbons; (3) the stripped liquid phase, still containing about 10 to 100 parts per million of organic nitrogen, is then subjected to catalytic hydrocracking in countercurrent flow with hydrogen, and at relatively low temperatures, to produce an overhead vapor phase comprising the desired light hydrocarbon product (e.g., gasoline), and an unconverted liquid phase heavy recycle oil; (4) the heavy recycle oil is at least partially recycled to the top of the countercurrent hydrocracking operation; (5) the combined vapor phase effluents from the hydrofining step and the countercurrent hydrocracking step are cooled and condensed to recover recycle hydrogen and a liquid condensate; (6) the liquid condensate is fractionated to recover the desired low boiling product fraction and an intermediate-boiling-range light recycle oil; and (7) the light recycle oil is subjected to further hydrocracking, either in a second hydrocracking zone in concurrent flow with hydrogen, or by recycle to the initial countercurrent hydrocracking zone, where it may be introduced either with the upflowing hydrogen stream or with the downflowing liquid feed.

According to a preferred embodiment of the invention, the initial hydrofining step is "integral" with the countercurrent hydrocracking step, i.e., there is no substantial depressuring and repressuring, or cooling and reheating of the liquid phase hydrofiner effluent before it is subjected to the countercurrent hydrocracking. It is also preferred to operate the countercurrent hydrocracking step at a temperature which is substantially the same as, or lower than, the temperature of the initial hydrofining step. A requirement of the process is that the hydrogen stream used in the countercurrent hydrocracking step must be substantially free of ammonia, and in some cases substantially free of hydrogen sulfide. To meet these requirements, the invention also embraces certain novel and advantageous methods for providing a substantially pure hydrogen stream for the countercurrent hydrocracking.

As may be apparent from the foregoing, this invention centers mainly about the problem of how to deal most economically with hydrocracking feedstocks which contain organic nitrogen compounds. As is well known, these nitrogen compounds are mostly basic in character, and tend to poison the acidic cracking centers of hydrocracking catalysts. It has recently been proposed (U.S. Patent No. 3,058,906) to overcome the deleterious effects of these nitrogen compounds by adding water and a halogen compound to the hydrocracker feed. This solution is feasible only if the hydrocracking catalyst is stable in the presence of water vapor and hydrogen halides, and in any event, the presence of these materials leads to corrosion problems, and plugging problems resulting from condensation of salts in the product recovery system. According to the present invention, the poisoning effect of nitrogen compounds is substantially reduced without resorting to the use of added halides, and water- and acid-sensitive catalysts such as those based on molecular sieve zeolites may hence be employed.

A more conventional prior art method for avoiding the effect of nitrogen compounds involves subjecting the feed to a preliminary catalytic hydrofining treatment in order to convert the nitrogen compounds to ammonia. The hydrofined product is then condensed and washed to remove ammonia, and the remaining nitrogen-free hydrocarbons are subjected to hydrocracking. One of the principal objections to this hydrofining pretreatment is that the facilities required for condensing, washing, reheating and repressuring the hydrofiner effluent are very expensive.

A partial solution to the expense involved in such separate, or non-integral, hydrofining treatments has recently been proposed (U.S. Patent No. 3,159,568), and consists in merely passing the entire hydrofiner effluent directly through a hydrocracking catalyst bed. It has been found that the ammonia formed during hydrofining does not repress hydrocracking catalyst activity as much as the original organic nitrogen compounds, and hence a considerable degree of hydrocracking can be carried out in the presence of ammonia. However, even better results would be obtainable if the ammonia were removed. It is accordingly one of the objects of this invention to provide methods for removing the ammnoia formed during hydrofining, but still without resorting to the expensive non-integral type of hydrofining.

Another major economic drawback involved in hydrofining pretreatments, either of the integral or non-integral type, involves the substantial investment in hydrofining catalyst and hydrofining reactor space which is required if the nitrogen content of the feed is to be reduced to below about 10 parts per million, which is normally required for the efficient utilization of hydrocracking catalysts in conventional concurrent flow contacting. Due to the kinetics involved in the denitrogenation reaction, there is logarithmic ratio between liquid hourly space velocity and the degree of completion of the denitrogenation, which ratio can be expressed as follows:

$$\frac{1}{LHSV} = C \log \left(\frac{N_f}{N_p}\right)$$

where C is a constant depending upon catalyst activity and reaction conditions, LHSV is liquid hourly space velocity, $N_f$ is percent nitrogen in the feed, and $N_p$ is percent nitrogen in the product. From this relationsihp it can be calculated that if a given catalyst, used under a given set of conditions, will reduce the nitrogen content of a feedstock from 1,000 parts per million to 100 parts per million at 1.0 space velocity, a space velocity of 0.5 will be required to give a product containing only 10 parts per million of nitrogen. This means that, where only one volume of catalyst is required to remove the first 900 parts per million of nitrogen, another equal volume of catalyst will be required to remove the next 90 parts of nitrogen. Thus, it is obvious that catalytic hydrofining becomes a fairly expensive operation when it is required that the nitrogen content of the feed be reduced to below about 10 parts per million, as is generally required in conventional hydrocracking processes operating at below about 750° F.

It is known in the art that the deleterious effects of nitrogen compounds in hydrocracking can be overcome to a considerable extent by operating at high hydrocracking temperatures, i.e., above about 800° F. However, this solution becomes somewhat impractical when the feedstock contains hydrocarbons boiling above about 650° F., since high molecular weight aromatic hydrocarbons tend to cause rapid deactivation of the catalyst at high temperatures. We have found, however, that the benefits of low-temperature hydrocracking, i.e., at temperatures below about 800° F., can still be obtained even when using high-boiling feeds, and without resorting to the expensive complete removal of nitrogen by hydrofining. Specifically, it has been found that if the nitrogen content is reduced to between about 10 and 100 parts per million, as by partial hydrofining, the resulting liquid hydrofiner effluent can then be successfully hydrocracked at below 800° F., without rapid catalyst deactivation, by simply carrying out such hydrocracking with liquid feed passing downwardly countercurrently to a rising stream of hydrogen. The hydrocracking catalyst in the upper portion of the bed appears to complete the decomposition of nitrogen compounds, and the stripping effect of the countercurrently flowing hydrogen is such that the ammonia formed can be continuously swept out of the reactor, leaving the major lower portion of the catalyst bed substantially nitrogen free. This desirable result is not achieved to the same extent when the feed to the hydrocracker contains more than about 100 parts per million of nitrogen, apparently because a larger portion of the bed becomes partially poisoned by organic nitrogen compounds and/or ammonia.

As a result of the incomplete hydrofining step followed by the countercurrent hydrocracking step, a substantial reduction in overall catalyst volume and reactor space required for a given feed throughput and conversion is achieved. More specifically, it has been found that if the hydrofining step is controlled so that denitrogenation is only about 90% to 99.5% complete, and if countercurrent hydrocracking is employed, there will be an overall reduced catalyst requirement (hydrofining plus hydrocracking) to achieve the same throughput and conversion at the same hydrocracking pressures and temperatures (average bed), as compared to those cases wherein hydrofining is 99.5% to 100% complete and concurrent-flow hydrocracking is utilized. Stated differently, a higher overall liquid hourly space velocity (with respect to hydrofining plus hydrocracking catalyst) may be used to achieve the same throughput and conversion if the feed is hydrofined to remove only about 90–99.5% of the nitrogen and countercurrent hydrocracking is employed, as compared to a complete, 99.5–100% denitrogenation followed by concurrent-flow hydrocracking under the same conditions of temperature and pressure.

From the foregoing it will appear that one objective of the invention is to obtain all of the substantial benefits of pre-hydrofining without the normally accruing disadvantage of the expensive condensation, washing, reheating and repressuring facilities required for separate, or non-integral hydrofining. A more specific object is to reduce the overall reactor space and catalyst required for the catalytic hydrofining and hydrocracking of hydrocarbon feeds. Another objective is to provide a low-temperature hydrocracking process which can tolerate maximum amounts of nitrogen compounds. Other objectives will be apparent from the more detailed description which follows.

Figure 2:
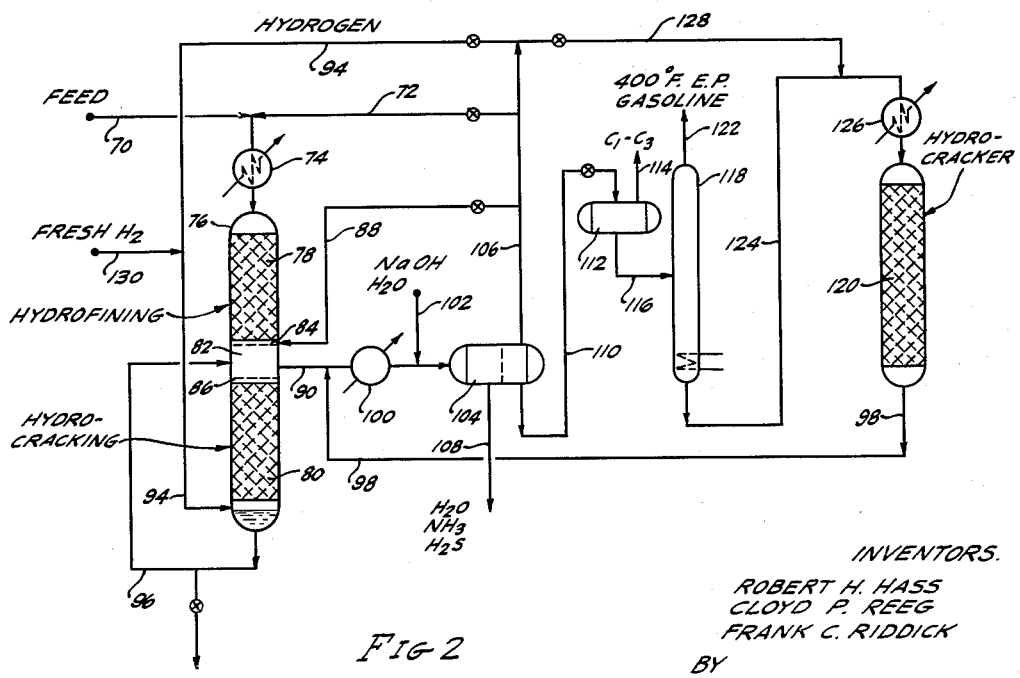

The invention may perhaps be more readily understood with reference to the accompanying drawings. FIGURE 1 is a flowsheet illustrating the invention in one of its simpler aspects, with a single stage of hydrocracking. FIGURE 2 is a flowsheet illustrating another modification of the invention utilizing two stages of hydrocracking, one countercurrent and one concurrent. FIGURE 3 is a flowsheet illustrating a modified version of the process of FIGURE 2, adapted especially for the production of jet fuel.

FIGURE 4 is a detailed vertical cross-sectional illustration of the quench-gas engaging and vapor phase disengaging sections of reactors 76 and 144 in FIGURES 2 and 3, respectively. In the succeeding description, it will be understood that the drawings have been simplified by the omission of certain conventional elements such as valves, pumps, compressors and the like. The heating and cooling units indicated are merely symbolic, and in actual practice many of these would be combined into banks of heat exchangers and fired heaters, according to standard engineering practice.

Referring more particularly to FIGURE 1, the initial feedstock is brought in via line 2, mixed with recycle hydrogen from line 4, preheated to incipient hydrofining temperature in heater 6, and then passed directly into hydrofiner 8, containing a bed of hydrofining catalyst 9, where hydrofining proceeds under substantially conventional conditions. Suitable hydrofining catalysts include for example mixtures of the oxides and/or sulfides of cobalt, and/or nickel with molybdenum, or of nickel and tungsten, preferably supported on a carrier such as alumina, or alumina containing a small amount of coprecipitated silica gel. Other suitable catalysts include in general the oxides and/or sulfides of the Group VIB and/or Group VIII metals, preferably supported on substantially non-cracking, absorbent oxide carriers such as alumina, silica, titania, and the like. The hydrofining operation may be conducted either adiabatically or isothermally, and under the following general conditions:

HYDROFINING CONDITIONS

| | Operative | Preferred |
| --- | --- | --- |
| Temperature, ° F. (avg. bed) | 600–850 | 650–825 |
| Pressure, p.s.i.g. | 500–3,000 | 800–2,000 |
| LHSV, v./v./Hr. | 0.5–10 | 1–5 |
| $H_2$/oil ratio, s.c.f./b. | 500–15,000 | 1,000–10,000 |

The above conditions are suitably adjusted so as to reduce the organic nitrogen content of the feed to below about 100 parts per million, and preferably below about 50 parts.

The total hydrofined product from hydrofiner 8 is withdrawn and transferred via heat exchanger 10 and line 12 to a countercurrent stripping column 14. The hydrofiner effluent is only partially cooled in heat exchanger 10, preferably to a temperature not substantially lower than the temperature employed in the subsequent hydrocracking zone, e.g., to about 500–750° F., and is still at substantially reactor pressure.

In stripping column 14, hot vapor phase effluent from hydrocracker 24 is admitted at the bottom via line 16 and travels upwardly countercurrently to the descending liquid phase from hydrofiner 8. The vapor phase portion of hydrofiner effluent separates at the top of stripping column 14, and is taken overhead via line 18, along with the vapor phase stripping effluent. It will be apparent that this combined vapor phase in line 18 contains the bulk of product hydrocarbons from the hydrocracker, as well as ammonia, hydrogen sulfide and hydrogen. The stripped liquid phase hydrofiner effluent, now substantially free of ammonia, is withdrawn via line 20 and transferred via preheater 22 to the top of countercurrent hydrocracking reactor 24, containing a bed of granular hydrocracking catalyst 26, through which it percolates countercurrently to a rising stream of hydrogen admitted via line 28 and hydrogen preheater 30.

The process conditions in hydrocracker 24 are suitably adjusted so as to provide about 20–80% conversion to gasoline or other desired product, per pass, while at the same time permitting relatively long runs between regenerations, i.e., from about 2 to 8 months. For these purposes, it will be understood that pressures in the high range will be used in conjunction with temperatures in the high range, while the lower operative pressures will normally be used in conjunction with the lower temperatures. The range of operative conditions contemplated for hydrocracker 24 are as follows:

COUNTERCURRENT HYDROCRACKING CONDITIONS

|  | Operative | Preferred |
|---|---|---|
| Temperature, °F. (avg. bed) | 400–850 | 450–800 |
| Pressure, p.s.i.g. | 500–3,000 | 800–2,000 |
| LHSV, v./v./Hr. | 0.5–20 | 1.0–10 |
| $H_2$/oil ratio, s.c.f./b. | 500–15,000 | 1,000–10,000 |

Those skilled in the art will readily understand that when ranges of operating conditions are specified as above, a large number of determinative factors are involved. Thus, highly active catalysts, or fresh catalysts at the beginning of a run, will be used in conjunction with lower temperatures than will less active or partially deactivated catalysts. The lower limit of pressure to be utilized in a given operation will normally depend upon the desired run length. Lower pressures generally result in a more rapid deactivation of the catalyst, and hence where extremely long run lengths are desired, pressures of above about 1,000 p.s.i.g. are mandatory. However, economically feasible run lengths are normally obtainable with most catalysts and feedstock within the 600–2,000 p.s.i.g. pressure range.

In hydrocracker 24, the rising hydrogen stream continuously sweeps out of the reactor the gasoline and other low-boiling hydrocarbons, and ammonia, as they are formed therein, the resulting vapor phase being withdrawn via line 16 and transferred to stripper 14 as previously described. The unconverted liquid phase in hydrocracker 24 accumulates in the bottom thereof, and is withdrawn via line 34, and may be partially or wholly recycled to the top of the reactor via line 35. If 100% conversion is not desired, a portion of this unconverted oil may be withdrawn from the process via line 36.

Returning to stripping column 14, the vapor phase stripping effluent therefrom in line 18 is transferred via cooler 38 and line 40, at a temperature of about 50–200° F., to high pressure separator 42, from which impure recycle hydrogen is withdrawn via line 44. A portion of this recycle hydrogen requires no purification and is hence recycled directly to hydrofiner 8 via line 4. However, the portion of recycle hydrogen to be used in hydrocracker 24 requires purification and is hence diverted via line 46 to a scrubbing column 48 where it passes upwardly countercurrently to a descending stream of aqueous caustic admitted via line 50. Spent caustic containing dissolved ammonium salts and hydrogen sulfide is withdrawn via line 52. Purified hydrogen is taken overhead via line 54 and recycled to the bottom of hydrocracker 24 as previously described. In order to reduce to a minimum the amount of hydrogen which must be subjected to the scrubbing operation, it is preferred to admit the whole of the makeup hydrogen required in both reactors to recycle line 54 via line 56.

The liquid hydrocarbon condensate in separator 42 is depressured via line 58 into low pressure separator 59, from The remaining liquid phase is then transferred via line 65 to fractionating column 60, from which a desired gasoline product fraction is taken overhead via line 62. The bottoms fraction from column 60 comprises an intermediate-boiling-range light recycle oil which may if desired be recycled to the top of hydrocracker 24 via lines 63 and 20, along with the heavy oil recycle from line 35. However, in a preferred modification, this light recycle oil is diverted via line 64 to hydrogen recycle line 54, and the mixture of hydrogen and oil (substantially all in vapor phase) is admitted to the bottom of hydrocracker 24 via preheater 30 and line 28. By operating in this manner, most or all of the light recycle oil must pass through the catalyst bed, and is not flashed directly off into line 16, as may tend to occur when it is recycled to the top of the reactor.

Referring now to FIGURE 2, this modification illustrates a two-stage adaptation of the process designed especially for the production of a 400° F. end-point gasoline. It also illustrates suitable means for incorporating the hydrofining zone and the countercurrent hydrocracking zone in a single reactor.

The initial feedstock is brought in via line 70, blended with recycle hydrogen from line 72, and the mixture is passed into the top of dual-bed reactor 76 via preheater 74. Reactor 76 comprises an upper bed of hydrofining catalyst 78, a lower bed of hydrocracking catalyst 80, and an intervening vapor disengaging space 82, the latter being shown in greater detail in FIGURE 4. Hydrofining proceeds in upper catalyst bed 78 substantially as described in connection with hydrofiner 8 of FIGURE 1. The total hydrofining effluent passes into a quench-gas engaging and mixing section 84, into which relatively cool hydrogen is injected via line 88, to cool the effluent to approximately the desired hydrocracking temperature. The cooling also effects some additional condensation of liquid hydrocarbons. The mixed-phase effluent then emerges into vapor disengaging space 82, the vapor phase being withdrawn via line 90, and the liquid phase accumulating on bubble-cap tray 86. On bubble-cap tray 86 (or a plurality of such trays), stripping of the liquid phase hydrofiner effluent takes place by virtue of rising vapor phase effluent from hydrocracking bed 80, which passes upwardly through vapor risers 92 (FIGURE 4), the stripped liquid phase overflowing downwardly through said vapor risers and thus being distributed onto the top of lower hydrocracking catalyst bed 80. It will thus be apparent that the vapor phase withdrawn via line 90 comprises the combined vapor phase effluent from hydrofining bed 78 and hydrocracking bed 80, as well as substantially all of the ammonia formed during hydrofining.

Countercurrent hydrocracking is carried on in catalyst bed 80, with recycle hydrogen being admitted near the bottom of the reactor via line 94, and unconverted liquid phase being withdrawn via line 96, and recycled to the top of hydrocracking bed 80, as described in connection with hydrocracker 24 of FIGURE 1. The conditions of hydrocracking in catalyst bed 80 are also substantially the same as those previously described in connection with hydrocracker 24.

The vapor phase effluent in line 90 is mingled with the total effluent in line 98 from second-stage hydrocracker 120, and the mixture is then condensed in cooler 100, mixed with a stream of aqueous caustic from line 102, and passed into high pressure separator 104, from which recycle hydrogen is withdrawn in line 106, portions of which are recycled to reactor 76 via lines 88, 72 and 94 as previously described. Spent caustic is withdrawn from separator 104 via line 108 containing dissolved ammonia and hydrogen sulfide salts. The hydrocarbon condensate in separator 104 is then passed via line 110 to low pressure separator 112, from which light hydrocarbon gases are exhausted via line 114. The low pressure liquid condensate is then transferred via line 116 to fractionating column 118, from which 400° F. end-point gasoline is taken overhead via line 122.

The bottoms fraction from column 118 comprises a relatively light gas oil (compared to the recycle oil in line 96), and this material is transferred via line 124 and preheater 126 to second-stage hydrocracker 120, recycle hydrogen being supplied via line 128.

Hydrocracking in hydrocracker 120 takes place mostly in the vapor phase, with concurrent flow of feed and hydrogen. The conditions of hydrocracking may be substantially the same as those previously described for hydrocracker 24.

The caustic washing described in separator 104 provides a hydrogen recycle stream which is substantially free from ammonia and hydrogen sulfide. It is contemplated, however, that a simple water wash may be employed, especially in cases where the total desired product is gasoline. A water wash will remove substantially all of the ammonia, but will not remove all of the hydrogen sulfide. However, hydrogen sulfide is not detrimental in cases where gasoline is the desired product; in fact it is somewhat beneficial in that a more aromatic product is produced. However, in cases where non-aromatic products are desired, as when jet fuel is produced, it is preferred to remove substantially all ammonia and hydrogen sulfide from the recycle gas streams.

Referring now to FIGURE 3, this modification illustrates an alternative adaptation of the process of FIGURE 2, designed especially for the production of a light gasoline fraction and a saturated jet fuel prodct. The initial feed is brought in through line 140, mixed with purified recycle hydrogen from line 142, and the mixture is then passed into the top of reactor 144 via preheater 146. Reactor 144 contains an upper hydrofining catalyst bed 148, a subjacent vapor phase disengaging zone 150, a subjacent non-cracking hydrogenation catalyst bed 152, a subjacent recycle oil engaging zone 154, and a lower bed of hydrocracking catalyst 156. Hydrofining takes place in catalyst bed 148 as previously described in connection with hydrofiners 8 and 76. The partially hydrofined product is then partially cooled with recycle hydrogen admitted via line 158, and the total hydrofiner effluent then passes into vapor disengaging zone 150, from which vapor phase hydrofiner effluent and vapor phase hydrocracker effluent (from zones 152 and 156) are removed via line 160. The liquid phase hydrofiner effluent passes downwardly through countercurrent hydrogenation catalyst bed 152, countercurrently to rising vapor phase hydrogen and light hydrocarbons from hydrocracking zone 156.

Hydrogenation catalyst bed 152 is optional, and may be omitted if desired. Its function, however, is to effect further hydrogenation of heavy polycyclic, condensed-ring aromatic hydrocarbons in the liquid phase hydrofiner effluent, and thereby further prolong the life of hydrocracking catalyst in bed 156. For this purpose, it is necessary to utilize low hydrogenation temperatures and highly active hydrogenation catalysts. Temperatures in hydrogenation bed 152 should fall within the 400–700° F. range, and catalysts such as platinum, palladium or other noble metals, deposited upon a substantially neutral, non-cracking base such as alumina gel, charcoal, silica gel and the like may be utilized. Some of the remaining organic nitrogen and sulfur compounds from hydrofining bed 148 are also decomposed in hydrogenation catalyst bed 152.

The hydrogenated liquid phase from bed 152 trickles downwardly into recycle oil engaging zone 154, and the resulting mixture then continues downwardly through hydrocracking catalyst bed 156, countercurrently to a rising stream of hydrogen recycle gas admitted at the bottom of the reactor via line 162. Unconverted liquid phase heavy recycle oil is taken off via line 164 and recycled to engaging zone 154. A bleed stream may be withdrawn via line 166 if less than 100% conversion is required.

The total vapor phase effluent in line 160, containing hydrogen, desired hydrocarbon product vapors, as well as some higher boiling hydrocarbons, is condensed in heat exchanger 168, mixed with caustic wash solution from line 170 and transferred to high pressure separator 172, from which purified recycle gas is withdrawn via line 174 and distributed in reactor 144 as previously described. Here again, it is preferable to admit all of the fresh makeup hydrogen required in reactor 144 via lines 176 and 162 in order to provide as much pure hydrogen as possible for use in countercurrent contacting zones 156 and 152, thus minimizing the amount of caustic washing required in separator 172. Spent wash liquor from separator 172 is withdrawn via line 178, and the liquid condensate is depressured via line 180 into low pressure separator 182, from which light hydrocarbon gases are exhausted via line 184.

Liquid condensate in separator 182 is transferred via line 186 to fractionating column 188, from which a light gasoline blending stock (325° F. end-point) is taken overhead via line 190. The bottoms from column 188 is then sent to second-stage hydrocracking reactor 192 via line 194 and preheater 196, after being blended with fresh and recycle hydrogen from line 198 and 199. Hydrocracking in reactor 192 proceeds with concurrent flow of feed and hydrogen. The total effluent from hydrocracker 192 is withdrawn via condenser 200 and transferred via line 202 to high pressure separator 204, from which recycle gas for reactor 192 is taken off via line 198. Liquid condensate in separator 204 is then depressured via line 206 into low pressure separator 208, from which light hydrocarbon gases are exhausted via line 210. The liquid phase in separator 208 is then transferred via line 212 to fractionating colum 214, from which light gasoline is taken overhead via line 216 and blended with the light gasoline in line 190. A side-cut jet fuel fraction boiling between about 325–525° F. is taken off via line 218 and sent to product storage. The bottoms from column 214 is then preferably blended with feed to reactor 192, via lines 220 and 194. If desired, a portion of this recycle oil may be withdrawn via line 222 and utilized as diesel fuel.

Since the main purpose of hydrocracking in countercurrent hydrocracking bed 156 and hydrocracker 192 is to produce a maximum quantity of 525° F. end-point jet fuel, the conditions of hydrocracking in those zones are generally somewhat milder than those in hydrocracking zone 120. In particular, it is preferred to employ temperature of about 450–650° F., the other conditions being similar to those set forth for hydrocracker 24.

Reference is now made to FIGURE 4 for a more detailed illustration of suitable apparatus making up hydrogen quench zone 84 and vapor disengaging zone 82 of FIGURE 2. The same apparatus can be employed for vapor disengaging zone 150 of FIGURE 3. Hydrogen quench zone 84 is defined by an upper perforated plate 230, supporting catalyst bed 78, and a lower perforated plate 232 spaced a short distance below plate 230. Preferably, quench gas engaging zone 84 is interspersed with a plurality of vertical bars or baffles 234 in order to provide efficient mixing of the incoming quench hydrogen with the hydrofiner effluent from catalyst bed 78. Liquid and vapor phase effluent from catalyst bed 78 passes into quench zone 84 through the perforations in upper plate 230, is mixed therein with cool hydrogen, and the mixture then emerges through lower perforated plate 232 into vapor phase disengaging zone 82, where phase separation takes place. The liquid phase portion of hydrofiner effluent falls onto bubble cap tray 82, and overflows through vapor risers 92 onto lower hydrocracking catalyst bed 80, as previously described. Upflowing vapor phase from hydrocracking catalyst bed 80 travels upwardly through risers 92 and around the lower edges of bubble caps 240, thereby effecting a stripping of the liquid on tray 86. The combined vapor phase effluent from hydrofining bed 78 and vapor phase effluent from lower catalyst bed 80 is withdrawn through nozzle 236. A sloping baffle plate 238 may be provided above the nozzle outlet in order to minimize the entrainment of liquid in the vapor phase being withdrawn.

The feedstocks which may be treated herein include in general any mineral oil fraction having an initial boiling point above the conventional gasoline range, i.e., above about 400° F., and having an end-boiling-point of up to about 1,000° F. This includes straight-run gas-oils, coker distillate gas oils, deasphalted crude oils, cycle oils derived from catalytic or thermal cracking operations and the like. These fractions may be derived from petroleum crude oils, shale oils, tar sand oils, coal hydrogenation products and the like. Specifically, it is preferred to employ feedstocks boiling between about 400° and 900° F., having an API gravity of 15° to 35°, containing at least about 20% by volume of acid-soluble components (aromatics + olefins), and at least about 20% by volume of hydrocarbons boiling above 650° F. Such oils may also contain from about 0.1% to 5% of sulfur and from about 0.001% to 2% by weight of nitrogen.

The hydrocracking catalysts to be employed in the various hydrocracking units described above may consist of any desired combination of a refractory cracking base with a suitable hydrogenating component. Suitable cracking bases include for example mixtures of two or more refractory oxides such as silica-alumina, silica-magnesia, silicia-zirconia, alumina-boria, silica-titania, silica-zirconia-titania, acid treated clays and the like. Acidic metal phosphates such as aluminum phosphate may also be used. The preferred cracking bases comprise composites of silica and alumina containing about 50–90% silicia; co-precipitated composites of silicia, titania, and zirconia, containing between 5% and 75% of each component; partially dehydrated, zeolitic, crystalline molecular sieves, e.g., of the "X" or "Y" crystal types, having relatively uniform pore diameters of about 8 to 14 Angstroms, and comprising silica, alumina and one or more exchangeable zeolitic cations. Any of these cracking bases may be further promoted by the addition of small amounts, e.g., 1 to 10% by weight, of halogen or halides such as fluorine, boron trifluoride or silicon tetrafluoride, but preferably halides are absent.

The molecular sieve type cracking bases, when compounded with a hydrogenating metal, are particularly useful for hydrocracking at relatively low temperatures of 400–700° F., and relatively low pressures of 500–1,500 p.s.i.g. It is preferred to employ molecular sieves having a relatively high $SiO_2/Al_2O_3$ mole-ratio, e.g., between about 2.5 and 6.0, preferably 3.0 and 6.0. The most active forms are those wherein the exchangeable zeolitic cations are hydrogen and/or a polyvalent metal such as magnesium, calcium, chromium, zinc, rare earth metals, etc. Particularly preferred are the "Y" molecular sieves, wherein the $SiO_2/Al_2O_3$ ratio is about 4–5, and wherein at least about 30% of the ion-exchange capacity thereof is satisfied by hydrogen ions. Normally, such molecular sieves are prepared first in the sodium or potassium form, and the monovalent metal is ion-exchanged out with a polyvalent metal, or where the hydrogen form is desired, with an ammonium salt followed by heating to decompose the zeolitic ammonium ion and leave a hydrogen ion. It is not necessary to exchange out all of the monovalent metal; the final compositions may contain up to about 6% by weight of $Na_2O$, or equivalent amounts of other monovalent metals. Zeolites of this nature are more particularly described in U.S. Patent No. 3,130,006.

It should be noted that the zeolites described in U.S. Patent No. 3,130,006, are designated therein as being "decationized." For purposes of this invention, the decationized zeolites are regarded as equivalent to the hydrogen zeolites, and both forms, or the mixed forms, are designated herein as being "metal-cation-deficient," a term which also includes the ammonium forms.

As in the case of the X molecular sieves, the Y sieves also contain crystal pores of relatively uniform diameter between about 6 and 14 A., usually between about 9 and 11 A., depending upon the metal ions present.

The foregoing cracking bases are compounded, as by impregnation, with from about 0.5 to 25% (based on free metal) of a Group VI-B or Group VIII metal promoter, e.g., an oxide or sulfide of chromium, tungsten, cobalt, nickel, or the corresponding free metals, or any combination thereof. Alternatively, even smaller proportions, between about 0.05% and 2% of the noble metals, e.g. platinum, palladium, rhodium or iridium may be employed. The oxides and sulfides of other transitional metals may also be used, but to less advantage than the foregoing.

In the case of the zeolitic type cracking bases, it is preferable to distribute the hydrogenating metal thereon by ion exchange. This can be accomplished by digesting the zeolite with an aqueous solution of a suitable compound of the desired hydrogenating metal wherein the metal is present in a cationic form, and then reduced to from the free metal, as described for example in Belgian Patent No. 598,686.

The following examples are cited to illustrate suitable specific operating conditions for the three major process schemes described above. In each example, the initial feed is a 400–760° F. boiling range catalytic cracking cycle oil containing 1.28% of sulfur and 0.2% of nitrogen by weight, and having an API gravity of 19.2°. The hydrofining catalyst is composed of about 4% cobalt sulfide plus 16% of molybdenum sulfide impregnated on a silica-stabilized (5% $SiO_2$) activated alumina support. The hydrocracking catalyst throughout is a magnesium "Y" molecular sieve containing about 3% by weight of zeolitic magnesium, and loaded with about 0.5% by weight of palladium. In each example, the conditions given are based upon substantially fresh catalyst activities. The hydrofining conditions shown are designed to reduce the organic nitrogen content of the feed to about 50 parts per million.

*Example I*

Operating in accordance with FIGURE 1, and with total recycle of unconverted oils (the bottoms from column 60 being recycled to the bottom of hydrocracker 24), suitable operating conditions are as follows:

TABLE 1

| Operating Conditions | Hydrofiner 8 | Stripper 14 | Hydrocracker 24 |
| --- | --- | --- | --- |
| LHSV | 1.0 | | 1.5 |
| Pressure, p.s.i.g | 1,500 | 1,500 | 15,000 |
| Temperature, °F | 700 | 620 | 655 |
| H₂/oil ratio, s.c.f./b | 4,000 | | 8,000 |

The approximate product distribution and yields are as follows, on the basis of an operation utilizing 10,000 barrels per day of initial feed:

TABLE 2

Conversion to 400° F. E.P. gasoline
  and lighter _____ 100 vol. percent.
$C_1$–$C_3$ dry gas _____ 110 s.c.f./b feed.
Liquid products:
  Butanes _____ 1,100 b/d.
  $C_5$–$C_6$ _____ 2,200 b/d.
  $C_7$–400° F. _____ 8,300 b/d.
Chemical hydrogen consumption ____ 2,380 s.c.f./b feed.

To achieve these results under the same hydrocracking conditions except using conventional concurrent flow in the hydrocracker, it is necessary to reduce the organic nitrogen level of the hydrofiner effluent to below about 10 p.p.m., requiring a hydrofining space velocity below about 0.62, or at least about 1.6 times the volume of hydrofining catalyst required at the 1.0 space velocity.

Conversely, if the hydrofining space velocity is maintained at the level giving 50 p.p.m. of unconverted organic nitrogen in the product, and if concurrent-flow hydrocracking is employed under otherwise identical conditions of pressure and temperature as in the example, the liquid hourly space velocity in the hydrocracker must then be reduced to below 1.0, requiring at least about 1.5 times the volume of hydrocracking catalyst required at the 1.5 space velocity, to achieve the same results.

*Example II*

Operating in accordance with FIGURE 2, with total recycle of unconverted oil, and using a simple water wash in separator 104 so as to remove substantially all ammonia from the recycle gas, but not all of the $H_2S$, suitable operating condition are as follows:

TABLE 3

| Operating Conditions | Hydrofining Zone 78 | Vapor disengaging Zone 82 | Hydrocracking Zone 80 | Hydrocracking Zone 120 |
|---|---|---|---|---|
| LHSV | 1.0 | | 1.5 | 1.5 |
| Pressure, p.s.i.g. | 1,500 | 1,500 | 1,500 | 1,500 |
| Temperature, °F | 700 | 675 | 695 | 625 |
| $H_2$/oil ratio, s.c.f./b | 4,000 | | 8,000 | 8,000 |

The approximate product distribution and yields are as follows, on the basis of an operation utilizing 10,000 barrels per day of feed:

TABLE 4

Conversion to 400° F. E.P. gasoline
and lighter _____ 100 vol. percent.
$C_1$–$C_3$ dry gas _____ 124 s.c.f./b.
Liquid products:
  Butanes _____ 1,200 b/d.
  $C_5$–$C_6$ _____ 2,100 b/d.
  $C_7$–400° F. _____ 8,200 b/d.
Chemical hydrogen consumption ___ 2,350 s.c.f./b feed.

*Example III*

In a total recycle operation as described in FIGURE 3 (utilizing a 1% Pt on alumina catalyst in zone 152), suitable operating conditions are as follows:

TABLE 5

| Operating Conditions | Hydrofining Zone 148 | Vapor disengaging Zone 150 | Hydrogenation Zone 152 | Hydrocracking Zone 156 | Hydrocracking Zone 192 |
|---|---|---|---|---|---|
| LHSV | 1.0 | | 3 | 1.5 | 1.5 |
| Pressure, p.s.i.g | 1,500 | 1,500 | 1,500 | 1,500 | 1,500 |
| Temp. °F | 750 | 525 | 550 | 600 | 575 |
| $H_2$/oil ratio, s.c.f./b | 4,000 | | 9,000 | 8,000 | 8,000 |

The approximate product distribution and yields are as follows, based on 10,000 barrels per day of initial feed:

TABLE 6

Conversion to 325° F. E. P. gasoline
and lighter _____ 72 vol. percent.
Conversion to 325–525° F. Jet fuel _ 50 vol. percent.
$C_1$–$C_3$ dry gas _____ 60 s.c.f./b.
Total chemical hydrogen
consumption _____ 2,500 s.c.f./b.

Results analogous to those indicated in the foregoing examples are obtained when other hydrocracking catalysts and conditions, other feedstocks and other hyrofining conditions within the broad purview of the above disclosure are employed. It is hence not intended to limit the invention to the details of the examples or the drawings, but only broadly as defined in the following claims.

We claim:

1. A process for converting a hydrocarbon feedstock containing more than 100 parts per million of organic nitrogen and boiling above the gasoline range to lower boiling hydrocarbons, which comprises subjecting said feedstock to a limited catalytic hydrofining to convert at least about 99% but not more than about 99.5% of the organic nitrogen in said feedstock to ammonia, then passing the partially hydrofined liquid effluent downwardly through a bed of granular hydrocracking catalyst at hydrocracking temperatures below about 800° F. and pressures between about 500 and 2,500 p.s.i.g., while flowing a stream of initially ammonia-free hydrogen upwardly through said catalyst bed in countercurrent contact with said downflowing liquid hydrofiner effluent, recovering a vapor phase mixture of hydrogen and low-boiling liquid hydrocarbons from the top of said hydrocracking catalyst bed, and separating desired low-boiling hydrocarbons from said vapor phase mixture.

2. A process as defined in claim 1 wherein said hydrocracking catalyst is a crystalline, alumino-silicate molecular sieve having a $SiO_2/Al_2O_3$ mole-ratio of at least about 3.0, containing zeolitic cations from the class consisting of hydrogen and polyvalent metals, and promoted with a Group VIII noble metal hydrogenating component.

3. A process as defined in claim 1 wherein said limited catalytic hydrofining is controlled so as to give a partially hydrofined liquid effluent containing between about 10 and 100 p.p.m. of organic nitrogen.

4. A process as defined in claim 1 wherein said hydrocracking is carried out in the absence of added halogen.

5. A process for converting a hydrocarbon feedstock boiling above the gasoline range and containing organic nitrogen compounds to lower boiling hydrocarbons, which comprises:

(A) subjecting said feedstock to incomplete catalytic hydrofining in concurrent flow with hydrogen at temperatures between about 600° and 850° F., and under space velocity conditions adjusted to convert at least about 90% but not more than about 99.5% of the organic nitrogen in said feedstock to ammonia;

(B) separating effluent from said hydrofining into a liquid phase and a vapor phase;

(C) stripping the liquid phase effluent from said hydrofining with the overhead vapor phase effluent from the hereinafter defined countercurrent hydrocracking step (D), said stripping being carried out at temperatures and pressures not substantially lower than the temperature and pressure prevailing in said countercurrent hydrocracking step, thereby producing a vapor phase stripping effluent and a stripped liquid phase;

(D) passing said stripped liquid phase from step (C) downwardly through a fixed bed of granular hydrocracking catalyst in countercurrent contact with a rising hydrogen stream and at a hydrocracking temperature below about 800° F., so as to produce an overhead vapor phase effluent comprising hydrogen, low-boiling product hydrocarbons and a small proportion of ammonia formed by the decomposition of nitrogen compounds remaining from said incomplete hydrofining step (A); and (E) recovering a desired low-boiling hydrocarbon product from the vapor phase stripping effluent from said stripping step (C).

6. A process as defined in claim 5 wherein a high-boiling unconverted recycle oil is recovered as liquid bottoms from said countercurrent hydrocracking step (D), and is recycled at least in part to said countercurrent hydrocracking.

7. A process as defined in claim 5 wherein said hydrocarbon feedstock contains more than about 100 parts per million of organic nitrogen, and wherein said hydrofining space velocity is adjusted so as to reduce the organic nitrogen content to between about 10 and 100 parts per million.

8. A process as defined in claim 5 wherein said countercurrent hydrocracking step (D) is carried out in the absence of added halogen.

9. A process as defined in claim 5 wherein said hydrocracking catalyst is a crystalline, alumino-silicate molecular sieve having a $SiO_2/Al_2O_3$ mole-ratio of at least about 3.0, containing zeolitic cations from the class consisting of hydrogen and polyvalent metals, and promoted with a Group VIII noble metal hydrogenating component.

10. A process as defined in claim 5, including the further steps of:
    (F) condensing and separating said vapor phase stripping effluent from step (C) to give a recycle hydrogen stream and a liquid hydrocarbon condensate;
    (G) fractionating said liquid condensate to recover the desired low-boiling hydrocarbon product specified in step (E) and a higher boiling light recycle oil; and
    (H) recycling said light recycle oil to said countercurrent hydrocracking step (D).

11. A process as defined in claim 10 wherein said light recycle oil is recycled to the top of said hydrocracking catalyst bed used in step (D).

12. A process as defined in claim 10 wherein said light recycle oil is introduced in vapor phase at the bottom of said hydrocracking catalyst bed used in step (D), along with said rising hydrogen stream.

13. A process as defined in claim 10 wherein a portion of said recycle hydrogen stream is recycled without purification to said hydrofining step, and wherein another portion of said recycle stream is treated to remove ammonia and is then recycled, along with total fresh makeup hydrogen required in the process, to the bottom of said hydrocracking catalyst bed.

14. A process for converting a nitrogen-containing hydrocarbon feedstock boiling above the gasoline range to lower boiling hydrocarbons, which comprises:
    (A) subjecting said feedstock to catalytic hydrofining in concurrent flow with hydrogen at temperatures between about 600° and 850° F., and under space velocity conditions adjusted to give an incomplete denitrogenation of said feedstock such that at least about 10 p.p.m. of organic nitrogen remains therein;
    (B) separating effluent from said hydrofining into a liquid phase and a vapor phase;
    (C) stripping the liquid phase effluent from said hydrofining with the vapor phase effluent from the hereinafter defined countercurrent hydrocracking step (D), said stripping being carried out at temperatures and pressures not substantially lower than the temperature and pressure prevailing in said countercurrent hydrocracking step, thereby producing a vapor phase stripping effluent and a stripped liquid phase;
    (D) passing said stripped liquid phase from step (C) downwardly through a fixed bed of granular hydrocracking catalyst in countercurrent contact with a rising hydrogen stream and at a hydrocracking temperature below about 800° F., so as to produce an overhead vapor phase effluent comprising hydrogen, low-boiling product hydrocarbons and a small proportion of ammonia formed by the decomposition of nitrogen compounds remaining from said incomplete hydrofining step (A), any remaining unconverted liquid oil from said countercurrent contacting being recycled thereto;
    (E) blending said vapor phase stripping effluent and said vapor phase hydrofining effluent and cooling and condensing the resulting mixture;
    (F) separating the condensed mixture into a hydrogen recycle stream and a liquid hydrocarbon condensate;
    (G) fractionating said liquid condensate to recover a desired low-boiling product fraction and a light gas oil bottoms fraction;
    (H) subjecting said light gas oil bottoms fraction to catalytic hydrocracking in a second hydrocracking zone in concurrent flow with hydrogen; and
    (I) recovering a desired low-boiling hydrocarbon product from the effluent from said second hydrocracking zone; said hydrocracking catalyst comprising a Group VIII noble metal hydrogenating component deposited upon a cracking base selected from the class consisting of silica-alumina composites, silica-magnesia composites, silica-zirconia composites, alumina-boria composites, silica-titania composites, silica-zirconia-titania composites, acid treated clays, acidic metal phosphates, and zeolitic alumino-silicate molecular sieves.

15. A process as defined in claim 14 wherein gasoline is recovered as the desired product in steps (G) and (I), and wherein said hydrogen recycle stream in step (F) is water-washed to remove substantially all ammonia, but not all of the hydrogen sulfide contained therein, and wherein portions of the washed recycle gas are recycled to each of said hydrocracking steps (D) and (H).

16. A process as defined in claim 14 wherein light gasoline is recovered as the desired low-boiling product in step (G) and a jet fuel fraction is recovered as the desired low-boiling product in step (I), and wherein said recycle hydrogen stream in step (F) is treated to remove substantially all the ammonia and hydrogen sulfide contained therein, and wherein portions of the purified recycle gas are recycled to each of said hydrocracking steps (D) and (H).

17. A process as defined in claim 14 wherein said stripped liquid phase from step (C) is subjected to an intervening non-cracking catalytic hydrogenation at temperatures below about 700° F. prior to said countercurrent hydrocracking step (D).

18. A process as defined in claim 14 wherein said hydrocabon feedstock contains more than about 100 parts per million of organic nitrogen, and wherein said hydrofining space velocity is adjusted so as to reduce the organic nitrogen content to between about 10 and 100 parts per million.

19. A process as defined in claim 14 wherein a portion of said recycle hydrogen stream is recycled without purification to said hydrofining step, and wherein another portion of said recycle stream is treated to remove ammonia and is then recycled, along with total fresh make-up hydrogen required in the process, to the bottom of said hydrocracking catalyst bed.

20. A process as defined in claim 14 wherein the hydrocracking catalyst employed in each of said hydrocracking steps (D) and (H) comprises a dehydrated, crystalline, alumino-silicate molecular sieve having a $SiO_2/Al_2O_3$ mole-ratio of at least about 2.5, and containing zeolitic hydrogen ions and a Group VIII noble metal hydrogenating component.

References Cited by the Examiner

UNITED STATES PATENTS

| | | | |
|---|---|---|---|
| 3,008,895 | 11/1961 | Hansford et al. | 208—89 |
| 3,023,158 | 2/1962 | Watkins | 208—89 |
| 3,026,260 | 3/1962 | Watkins | 208—245 |
| 3,058,906 | 10/1962 | Stine et al. | 208—111 |

DELBERT E. GANTZ, *Primary Examiner.*